United States Patent Office 3,185,712
Patented May 25, 1965

3,185,712
ALPHA-KETO-GAMMA-LACTONE DERIVATIVES
William Taub, 43 Ben-Zion St., Rehoboth, and Sander Vromen, 5 Vitkin St., Haifa, Israel
No Drawing. Filed Oct. 2, 1963, Ser. No. 313,195
7 Claims. (Cl. 260—343.6)

This application is a continuation-in-part of our application Serial No. 186,880, filed April 12, 1962, now abandoned.

This invention generally relates to novel organic compounds and is particularly directed to novel keto-lactones. It is an object of the present invention to provide novel α-keto-γ-lactones. It is a further object of the present invention to provide novel α-keto-γ-lactones characterized by therapeutically valuable physiological properties. More specifically, it is an object of the present invention to provide novel α-keto-γ-lactones characterized by antiphlogistic, antipyretic and anti-inflammatory properties. Other objects of the invention will become apparent hereinafter.

The present invention relates to novel α-keto-γ-lactones of the general formula

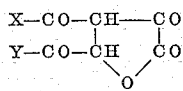

in which X and Y are members selected from the group consisting of alkyl having up to 8 carbon atoms, cycloalkyl having from 3 to 7 carbon atoms, phenyl, monohalogenated phenyl, alkoxyphenyl said alkoxy having up to 8 carbon atoms, naphthyl, biphenylyl, alkylphenyl said alkyl having up to 8 carbon atoms, phenylamino, and, when substituted for only one of X and Y, —O-alkyl having up to 8 carbon atoms, benzyloxy and —O-cycloalkyl having 3 to 7 carbon atoms. It will be noted that with regard to carbalkoxy, the above formula is restricted to compounds having unsymmetrical carbalkoxy substituents only, i.e. compounds in which only one of X and Y but not both are alkoxy, benzyloxy or cycloalkyloxy.

The invention also provides for a pharmaceutical composition exerting antiphlogistic, antipyretic and anti-inflammatory activity in dosage unit form, the composition essentially consisting of a compound of the above formula in combination with a suitable pharmaceutical diluent. The pharmaceutical composition in dosage unit form may, for example, be a tablet.

The present invention also provides for a process for preparing compounds of the above formula, which comprises reacting an acyl pyruvic acid ester with a suitable aldehyde at a temperature preferably not exceeding room temperature and working up by conventional means. According to a preferred embodiment of the invention, the reaction is effected in the range of temperatures between —5° C. to +10° C.

In the enol form the new compounds are pronouncedly acidic and can form salts with inorganic or organic bases as well as esters and ethers. The designation of the keto form of the compounds of this invention, whenever the context so requires or admits, is understood as including the enol form.

A better and fuller understanding may be had of the present invention by referring to the following examples, which are to be construed in an illustrative and not in a restrictive sense, and by referring to the following claims.

Example 1

A glass vessel, equipped with a mechanical stirrer, thermometer and condenser is charged with a dispersion of 22.2 g. (0.1 mole) of the sodium salt of ethyl isobutanoyl pyruvate in 150 ml. of dry benzene. A solution of 16.4 g. (0.1 mole) of freshly distilled benzyl glyoxylate in 50 ml. dry benzene is added with stirring during 20 minutes while the temperature is maintained at 0° C. by external cooling. When the sodium salt is completely dissolved, the mixture is left for a further hour at ambient temperature and then poured into 600 ml. of ice water with vigorous stirring. The aqueous layer is acidified with 50 ml. of ice-cold 10 percent hydrochloric acid, whereupon a light yellow oil separates. This mixture is extracted thrice, each time with 100 ml. of ether. The combined ethereal extracts are washed with water, dried over sodium sulfate, filtered and the solvent is removed from the filtrate. A residue of about 25 g. remains, which crystallizes immediately upon cooling to room temperature. After recrystallizing 3 times from carbon tetrachloride, pure α - keto-β-isobutanoyl-γ-carbobenzoxy-γ-lactone, melting at 102–103° C. is obtained.

Example 2

To a dispersion of 27.6 g. (0.1 mole) of the sodium salt of ethyl-para-chloro-benzoyl pyruvate in 200 ml. of dry benzene there is added dropwise with stirring a solution of 18.6 g. (0.1 mole) freshly distilled n-octyl glyoxylate in 50 ml. dry benzene while the temperature is maintained at 0° C. After one hour of additional stirring at ambient temperature, the yellow solution is poured with vigorous stirring into 600 ml. of ice/water mixture. The aqueous solution is discarded and the benzenic layer is shaken with 250 ml. of ice-cold 1 N aqueous NaOH solution until a precipitate is formed. The precipitate is filtered off with suction, dispersed in 500 ml. cold water and covered with a layer of 200 ml. of ether. To this 50 ml. of cold 10 percent hydrochloric acid is added with vigorous stirring. The ethereal layer is separated and the aqueous layer is extracted twice with portions of 100 ml. of ether. The combined ethereal extracts are washed with water and dried over sodium sulfate. After filtration and removal of the solvent by distillation a quantity of 17.1 g. of the crude reaction product are obtained. After 3 recrystallizations from methyl-cyclohexane, 11.2 g. of pure α-keto-β-para-chlorobenzoyl-γ-carbo-n-octyloxy-γ-lactone, melting at 58–59° C. are obtained.

Example 3

To a solution of 18.4 g. (0.1 mole) of ethyl cyclopropanoyl pyruvate in 70 ml. of dry benzene there is added 2.4 g. (0.104 mole) of technical sodium hydride with vigorous mechanical stirring. The mixture is cooled to 0° C. and a solution of 13.0 g. (0.1 mole) of freshly distilled n-butylglyoxylate in 40 ml. dry benzene is added dropwise with stirring while the temperature is maintained at about 0° C. After stirring for a further hour at room temperature, the clear yellow solution is poured into 400 ml. of ice water with vigorous stirring. The aqueous layer is separated, extracted twice with portions of 200 ml. of ether and then acidified with 50 ml. of ice-cold 10 percent hydrochloric acid with efficient stirring. A light yellow oily substance separates which is extracted three times, each time with 100 ml. of ether. The combined ethereal extracts are washed with water, dried over sodium sulfate and filtered off. The solvent is evaporated and 19.0 g. of the lactone is obtained as an oil. This is purified by extracting the ethereal solution with three portions of 25 ml. each of cold aqueous 5 percent sodium hydroxide. The combined basic solutions are washed twice with 25 ml. of ether and subsequently acidified with 50 ml. of cold 10 percent hydrochloric acid. The mixture is extracted with ether and after drying, filtration and removal of the solvent by evaporation of 14.8 g. of a yellow oil is obtained which crystallizes after standing for several weeks in a refrigerator. After a number of recrystallizations from methylcyclohexane, pure α-keto-β-cyclopropanoyl-γ-carbo-n-butoxy-γ-lactone is obtained, melting at 73–75° C.

*Example 4*

To a dispersion of 32.1 g. (0.1 mole) of the sodium salt of ethyl parabromobenzoyl pyruvate in 200 ml. of dry benzene there is added dropwise with stirring at 0° C. a solution of 13.4 g. (0.1 mole) of freshly distilled phenyl-glyoxal in 50 ml. dry benzene. The stirring is continued for a further 6 hours at ambient temperature and the reaction mixture is left overnight. A slightly turbid yellow solution is obtained which is poured into 500 ml. of ice-cold water with efficient stirring. The aqueous layer is extracted twice with 100 ml. each of ether and then acidified with dilute ice-cold hydrochloric acid. The mixture is extracted twice with 100 ml. of ether and from the combined ethereal extracts there is obtained, after working up as in the preceding examples, 19.2 g. of an oily solid. After boiling with carbon tetrachloride, 15.0 g. of a crystalline product are obtained. After several recrystallizations from a mixture of methanol-chloroform-carbon tetrachloride pure α-keto-β-parabromo-benzoyl-γ-benzoyl-γ-lactone, melting at 173–175° C. is obtained.

*Example 5*

To a dispersion of 20.8 g. (0.1 mole) of the sodium salt of ethyl isopropanoyl pyruvate in 120 ml. of dry benzene there is added dropwise with stirring a solution of 16.8 g. of freshly distilled parachloro-phenyl glyoxal in 60 ml. of dry benzene, with the temperature maintained at 0° C. The stirring is continued for an hour and a half at room temperature. A clear solution is obtained, which is poured, with vigorous stirring, into 500 ml. of ice water. The aqueous layer is separated, extracted twice with 100 ml. of ether each time and then acidified with 50 ml. of ice-cold 10 percent hydrochloric acid. The mixture is extracted with three portions of ether, the combined extracts are washed with water and dried over sodium sulfate. After filtration, the ether is removed and there is obtained a quantity of 20.6 g. of an oily substance. After standing for 3 weeks and trituration with a mixture of carbon tetrachloride and n-hexane, 13.5 g. of crystalline lactone are obtained. After 3 recrystallizations from carbon tetrachloride pure α-keto-β-isopropanoyl-γ-parachlorobenzoyl-γ-lactone, melting at 128–129° C. is obtained.

*Example 6*

To a dispersion of 24.8 g. of the sodium salt of ethyl cyclohexanoyl pyruvate in 200 ml. dry benzene there is added dropwise with constant stirring a solution of 11.4 g. of freshly distilled tertiary butyl-glyoxal in 50 ml. of dry benzene, while the temperature is maintained at 0° C. The stirring is continued during 1 hour at room temperature and the clear solution is poured into 400 ml. of ice water with vigorous stirring. The benzenic layer is separated and extracted with 150 ml. of water. The combined aqueous extracts are extracted twice with 100 ml. ether each time and then acidified with 50 ml. of ice-cold 10 percent hydrochloric acid. The mixture is extracted with 3 portions of 150 ml. each of ether and the combined ethereal extracts are washed with water, dried over magnesium sulfate, filtered and the solvent is removed by evaporation. From 17.5 g. of the solid residue, pure α-keto-β-cyclohexanoyl-γ-tertiary-butanoyl-γ-lactone is obtained after 4 recrystallizations from a mixture of carbon tetrachloride and pentane; melting point 114–115° C.

In an analogous manner the following compounds were prepared; X and Y designate the substituents shown in the formula on page 1:

| X | Y | M.P. (° C.) |
|---|---|---|
| -iso-butyl | —O-n-octyl | 54–55 |
| -iso-butyl | —O-iso-butyl | 71–73 |
| -phenyl | —O-n-octyl | 77–78 |
| -p-methoxy-phenyl | —O-n-octyl | oil |
| -p-tolyl | —O-n-octyl | 83–84 |
| -p-bromo-phenyl | —O-n-octyl | 56 |
| -p-chloro-phenyl | —O-cyclohexyl | 117 |
| -iso-butyl | —O-n-hexyl | 161–162 |
| -p-tolyl | —O-n-hexyl | oil |
| -tert-butyl | —O-n-hexyl | oil |
| -tert-butyl | —O—CH$_2$—C$_6$H$_5$ | 94–96 |
| -p-methoxy-phenyl | —O—CH$_2$—C$_6$H$_5$ | oil |
| -cyclopropyl | —O—CH$_2$—C$_6$H$_5$ | 117–118 |
| -iso-propyl | —O—CH$_2$—C$_6$H$_5$ | 72–73 |
| -cyclopropyl | —O-cyclohexyl | 90–91 |
| -cyclopropyl | —O-n-amyl | oil |
| -isopropyl | —O-n-amyl | 59–60 |
| -isopropyl | —O-iso-amyl | 55–57 |
| -p-tolyl | —NH-phenyl | 180–181 |
| -iso-propyl | -phenyl | 109–110 |
| -tert-butyl | -phenyl | 134–136 |
| -cyclohexene-2-yl | -phenyl | 94–96 |
| -cyclopropyl | -phenyl | 131–132 |
| -p-chloro-phenyl | -p-chloro-phenyl | 174–175 |
| -tert-butyl | -p-chloro-phenyl | oil |
| -iso-propyl | -p-methoxy-phenyl | 135–137 |
| -cyclopropyl | -p-methoxy-phenyl | 108–109 |
| -p-methoxy-phenyl | -p-chloro-phenyl | amorphous |
| -p-chloro-phenyl | -tert-butyl | 169 |
| -iso-propyl | -tert-butyl | 142 |
| -tert-butyl | -tert-butyl | 111 |
| -tert-butyl | -cyclopropyl | 99–100 |
| -cyclopropyl | -cyclopropyl | 121–123 |
| -biphenylyl | -phenyl | 148–150 |
| -naphthyl | -p-btomo-phenyl | 147–150 |
| -cyclopropyl | -tert-butyl | 100–101 |
| -iso-propyl | -cyclopropyl | 57–58 |
| -cyclohexyl | -cyclohexyl | 121–122 |
| -cyclohexyl | -p-bromo-phenyl | 165–167 |
| -iso-butyl | -α-naphthyl | 155–158 |
| -iso-butyl | -cyclopropyl | 57–58 |
| —O-ethyl | -tert-butyl | 82–84 |

The reaction according to the present invention may also be carried out with other reactive derivatives of pyruvic acid.

What is claimed is:
1. A compound of the formula

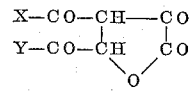

in which X and Y are members selected from the group consisting of alkyl having up to 8 carbon atoms, cycloalkyl having from 3 to 7 carbon atoms, phenyl, monohalogenated phenyl, alkoxyphenyl said alkoxy having up to 8 carbon atoms, naphthyl, biphenylyl, alkylphenyl said alkyl having up to 8 carbon atoms, phenylamino, —O-alkyl having up to 8 carbon atoms, benzyloxy and —O-cycloalkyl having 3 to 7 carbon atoms with the proviso that only one of the symbols X and Y may represent a member selected from the group consisting of —O-alkyl having up to 8 carbon atoms, benzyloxy and —O-cycloalkyl having 3 to 7 carbon atoms.

2. A compound of the formula:

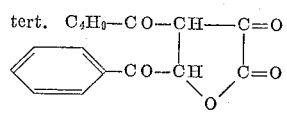

3. A compound of the formula:
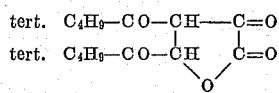
4. A compound of the formula:
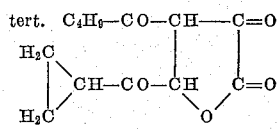
5. A compound of the formula:
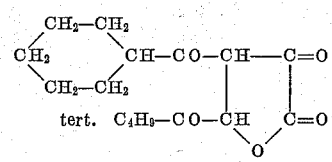
6. A compound of the formula:
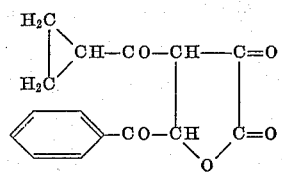
7. A compound of the formula:
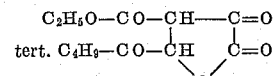
No references cited.
IRVING MARCUS, *Primary Examiner.*
NICHOLAS S. RIZZO, *Examiner.*